US006996752B2

(12) United States Patent
Hetrick et al.

(10) Patent No.: US 6,996,752 B2
(45) Date of Patent: Feb. 7, 2006

(54) SYSTEM, METHOD, AND COMPUTER PROGRAM PRODUCT WITHIN A DATA PROCESSING SYSTEM FOR CONVERTING A SPARE STORAGE DEVICE TO A DEFINED STORAGE DEVICE IN A LOGICAL VOLUME

(75) Inventors: William A. Hetrick, Wichita, KS (US); Stanley E. Krehbiel, Jr., Wichita, KS (US); Joseph Grant Moore, Wichita, KS (US); Carey Wayne Lewis, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 635 days.

(21) Appl. No.: 10/144,601

(22) Filed: May 13, 2002

(65) Prior Publication Data

US 2003/0212931 A1 Nov. 13, 2003

(51) Int. Cl.
*G11C 29/00* (2006.01)

(52) U.S. Cl. ...................................... 714/710; 714/770

(58) Field of Classification Search ................ 714/710, 714/711, 718, 719, 755, 763, 764, 765, 6, 714/7, 769, 770

See application file for complete search history.

(56) References Cited

U.S. PATENT DOCUMENTS

| | | | |
|---|---|---|---|
| 5,077,736 A | 12/1991 | Dunphy et al. | |
| 5,088,081 A | 2/1992 | Farr | |
| 5,357,509 A | 10/1994 | Ohizumi | |
| 5,548,712 A | 8/1996 | Larson et al. | |
| 5,727,144 A | 3/1998 | Brady et al. | |
| 5,848,229 A | 12/1998 | Morita | |
| 5,915,081 A | 6/1999 | Yamamoto et al. | |
| 6,237,109 B1 | 5/2001 | Achiwa et al. | |
| 6,598,174 B1 * | 7/2003 | Parks et al. | 714/6 |
| 2002/0161855 A1 | 10/2002 | Manczak et al. | |

* cited by examiner

*Primary Examiner*—Albert Decady
*Assistant Examiner*—James C. Kerveros
(74) *Attorney, Agent, or Firm*—Yee & Associates, P.C.

(57) ABSTRACT

A system, method, and computer program product in a data processing system for increasing data storage performance. The data processing system includes multiple primary storage devices and a spare storage device. A logical volume definition is established that defines logical volumes utilizing the primary storage devices. A failure of one of the primary storage devices is detected. Data that was stored on the failed primary storage device at the time the failure was detected is constructed on the spare storage device. The spare storage device is then assigned in the logical volume definition such that the spare storage device becomes a primary storage device. The reference to the failed primary storage device is removed from the logical volume definition.

20 Claims, 3 Drawing Sheets

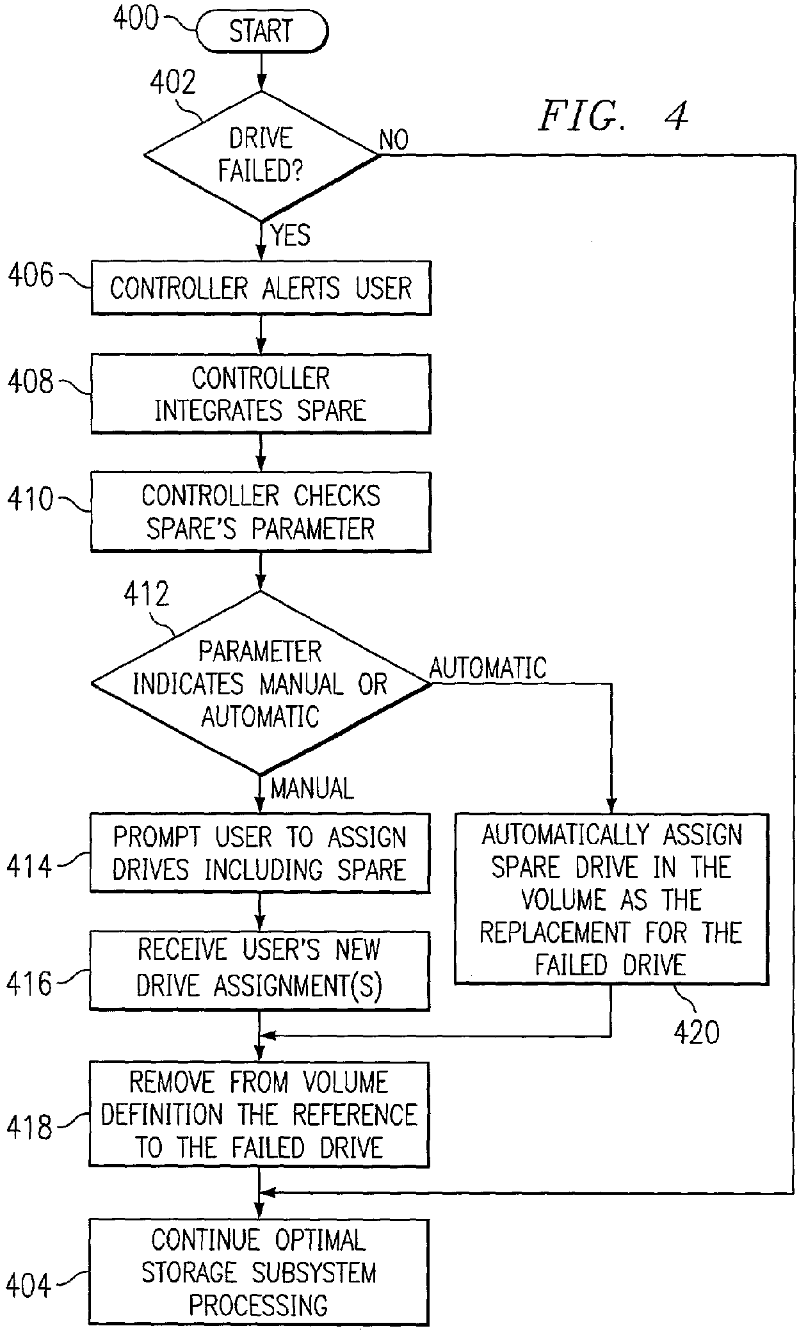
*FIG. 4*
*FIG. 5A*
*(PRIOR ART)*
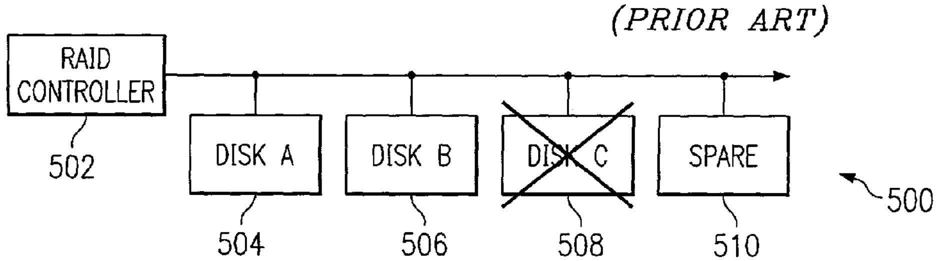

SYSTEM, METHOD, AND COMPUTER PROGRAM PRODUCT WITHIN A DATA PROCESSING SYSTEM FOR CONVERTING A SPARE STORAGE DEVICE TO A DEFINED STORAGE DEVICE IN A LOGICAL VOLUME

BACKGROUND OF THE INVENTION

1. Technical Field

The present invention relates generally to data processing systems including storage devices, and more particularly to a data processing system, method, and computer program product for converting a spare storage device to a defined storage device in a logical volume.

2. Description of the Related Art

Host computer systems often connect to one or more storage controllers that provide access to an array of storage devices. In a common storage controller, microprocessors communicate the data between the storage array and the host computer system. The host system addresses a "volume" of stored data through the storage controller using a logical identifier, such as Logical Unit Number (LUN) used in SCSI (Small Computer System Interface) subsystems. The term "volume" is often used as a synonym for all or part of a particular storage disk, but it also describes a virtual disk that spans more than one disk. In the latter case, the virtual disk presents a single, contiguous logical volume to the host system, regardless of the physical location of the data in the array. For example, a single volume can represent logically contiguous data elements striped across multiple disks. A file structure can also be embedded on top of a volume to provide remote access thereto, such as Network File System (NFS) designed by Sun Microsystems, Inc. and the Common Internet File System (CIFS) protocol built into Microsoft WINDOWS products and other popular operating systems.

There are many different types of storage controllers. Some storage controllers provide RAID (Redundant Array of Independent Disks) functionality for a combination of improved fault tolerance and performance. In RAID storage controllers on an SCSI bus, for example, the host system addresses a storage element by providing the single SCSI Target ID of the RAID storage controller and the LUN of the desired logical volume. A LUN is commonly a three-bit identifier used on a SCSI connection to distinguish between up to eight devices (logical units) having the same SCSI Target ID. Currently, SCSI also supports LUNs up to 64-bits. The RAID storage controller corresponding to the provided SCSI Target ID translates the LUN into the physical address of the requested storage element within the attached storage array.

A volume ID is another form of logical identifier. Volume IDs are typically 64-bit or 128-bit globally unique persistent world wide names that correspond directly to LUNs or identifiers for other storage representations. By providing a mapping to LUNs, volume IDs can be remapped if there is a collision between LUNs in a storage system, so as to present a set of unique volume IDs to a host accessing the storage system.

The term "RAID" was introduced in a paper entitled "A Case for Redundant Arrays of Inexpensive Disks (RAID)", Patterson et al., Proc. ACM SIGMOD, June 1988, in which five disk array architectures were described under the acronym "RAID". A RAID 1 architecture provides "mirroring" functionality. In other words, the data for each volume of a primary storage unit is duplicated on a secondary ("mirrored") storage unit, so as to provide access to the data on the secondary storage unit in case the primary storage unit becomes inoperable or is damaged.

A RAID 2 architecture provides error detection and correction ("EDC") functionality. For example, in U.S. Pat. No. 4,722,085 to Flora et al., seven EDC bits are added to each 32-bit data word to provide error detection and error correction capabilities. Each bit in the resultant 39-bit word is written to an individual disk drive (requiring at least 39 separate disk drives to store a single 32-bit data word). If one of the individual drives fails, the remaining 38 valid bits can be used to construct each 32-bit data word, thereby achieving fault tolerance.

A RAID 3 architecture provides fault tolerance using parity-based error correction. A separate, redundant storage unit is used to store parity information generated from each data word stored across N data storage units. The N data storage units and the parity unit are referred to as an "N+1 redundancy group" or "drive group". If one of the data storage units fails, the data on the redundant unit can be used in combination with the remaining data storage units to reconstruct the data on the failed data storage unit.

A RAID 4 architecture provides parity-based error correction similar to a RAID 3 architecture but with improved performance resulting from "disk striping". In disk striping, a redundancy group is divided into a plurality of equally sized address areas referred to as blocks. Blocks from each storage unit in a redundancy group having the same unit address ranges are referred to as "stripes". Each stripe has N blocks of data of different storage devices plus one parity block on another, redundant storage device, which contains parity for the N data blocks of the stripe. A RAID 4 architecture, however, suffers from limited write (i.e., the operation of writing to disk) performance because the parity disk is burdened with all of the parity update activity.

A RAID 5 architecture provides the same parity-based error correction as RAID 4, but improves "write" performance by distributing the data and parity across all of the available disk drives. A first stripe is configured in the same manner as it would be in RAID 4. However, for a second stripe, the data blocks and the parity block are distributed differently than for the first stripe. For example, if N+1 equals 5 disks, the parity block for a first stripe may be on disk 5 whereas the parity block for a second stripe may be on disk 4. Likewise, for other stripes, the parity disks are distributed over all disks in the array, rather than in a single dedicated disk. As such, no single storage unit is burdened with all of the parity update activity.

A RAID 6 architecture is similar to RAID 5, with increased fault tolerance provided by independently computed redundancy information in a N+2 redundancy group. A seventh RAID architecture, sometimes referred to as "RAID 0", provides data striping without redundancy information. Of the various RAID levels specified, RAID levels 0, 1, 3, and 5 are the most commonly employed in commercial settings.

In the prior art, when a primary disk fails, the data that had been stored on the failed drive is incorporated on one of the drives that had been assigned the role of "spare" drive. The storage controller maintains a list of drives that are designated as spare drives. In order for a disk to be used as a "spare" drive in accordance with one of the RAID architectures, the drive must be designated as a "spare". Unused, unavailable drives may not be used as spares.

Once the data is incorporated on the spare, the spare drive remains assigned the role of "spare" drive. The volume definition includes a reference to a failed drive. The volume configuration is non-optimal since it references a failed drive. Non-optimal processing may continue with the data stored on the spare drive. In order to return to optimal processing, a new primary drive must be used to replace the failed drive. Once the storage controller detects the removal of a failed drive and the insertion of a replacement drive, the storage controller updates the volume definition to reference the replacement drive, and starts copying data from the spare to the replacement drive. The spare drive then continues to be used as a spare drive. FIGS. 5A–5B and 6 depict this process in more detail.

FIGS. 5A and 5B illustrate block diagrams of a storage subsystem in accordance with the prior art. In the depicted example, storage subsystem 500 is a disk drive system including a controller 502. Controller 502 controls primary disk drives 504, 506, and 508. Disk 510 is a spare that is used in accordance with a RAID level 1, 2, 3, 4, 5, or 6. In the example depicted by FIG. 5A, disk 508 has failed. According to the prior art, when controller 502 detects that disk 508 has failed, controller 502 integrates spare 510 by constructing the data that had been stored on disk 508. The data stored on disks 504 and 508 is used to construct the data that had been stored on disk 508 in accordance with the RAID level implemented by the storage subsystem.

Once spare 510 is integrated, system 500 may continue to operate with disks 504, 506, and spare 510. However, the processing will be non-optimal because the logical volume definition includes a reference to a failed drive.

A logical volume definition typically includes a logical volume name or identifier, an identifier that identifies one or more physical drives that make up the logical volume identified by the logical volume name, and a logical unit identifier that is used by a host to communicate with the logical volume. For each logical volume, when the RAID standard is used, an indication of the RAID level for each logical volume is also included. Other information may also be included.

When a volume is first created, the user generally specifies a list of drives on which the volume is to be defined. Since a volume definition includes a list of drives, the act of assigning a drive to a volume adds a reference to that drive to the list of drives in the volume definition. Similarly, removing a drive, i.e. to remove a failed drive from the volume definition, deletes the reference to that drive within the volume definition. When a drive is included in a volume definition, the drive is called an "assigned" drive.

In order to put the system back in an optimal state, a user must replace primary drive 508 with a new primary drive 512. When the storage controller detects the replacement of the failed drive with a new, replacement drive, the storage controller will copy the data from spare 510 to new primary drive 512. After the data is copied to new primary drive 512, spare 510 then continues to be used as a spare. During this process, spare 510 is assigned within the storage controller as a spare drive. When the controller detects the replacement of a failed drive with a replacement drive, the controller updates the volume definition to include a reference to the replacement drive and then copies data from the spare to the replacement drive. The spare is then returned to a stand-by mode. Although once the data is copied and processing continues, the processing is non-optimal because the volume definition still includes a reference to a failed drive.

FIG. 6 illustrates a high level flow chart which depicts copying data from a spare drive to a new drive that replaced a failed drive in accordance with the prior art. The process starts as depicted by block 600 and thereafter passes to block 602 which illustrates a determination of whether or not a drive in the array has failed. If a determination is made that none of the disks has failed, the process passes to block 604 which depicts continuing optimal storage subsystem processing.

Referring again to block 602, if a determination is made that one of the drives has failed, the process passes to block 606 which illustrates the storage controller alerting the user that a drive has failed. Next, block 608 depicts the storage controller integrating the spare drive. When a drive is integrated, the data that was stored on the failed drive is reconstructed using the remaining drives. The reconstructed data is then stored on the spare drive.

Thereafter, block 610 illustrates the storage controller continuing processing. This processing, however, is non-optimal because the logical volume definition has not been changed to remove the reference to the failed drive. Next, block 612 depicts a determination of whether or not the storage controller has detected the replacement of the failed drive with a new, replacement drive. If a determination is made that no replacement drive has been detected, the process passes back to block 610. Referring again to block 612, if a determination is made that a replacement drive has been detected, the process passes to block 614 which illustrates the storage controller copying the data from the spare to the replacement drive. Next, block 616 depicts the storage controller returning the spare drive to a stand-by mode. The process then passes to block 618 which illustrates a continuation of non-optimal processing. Next, block 620 depicts a determination of whether or not the volume definition has been updated to remove the reference to the failed drive. If a determination is made that the volume definition has not been updated, the process passes back to block 618 which illustrates the continuation of non-optimal processing. Referring again to block 620, if a determination is made that the volume definition has been updated, the process passes back to block 604 which depicts the continuation of optimal processing.

Therefore, a need exists for a system, method, and computer program product for utilizing a spare storage device as a defined, replacement storage device in a logical volume such that optimal processing may be continued once a storage device has failed.

SUMMARY OF THE INVENTION

A system, method, and computer program product in a data processing system are disclosed for increasing data storage performance. The data processing system includes multiple primary storage devices and a spare storage device. A logical volume definition is established that defines logical volumes utilizing the primary storage devices. A failure of one of the primary storage devices is detected. Data that was stored on the failed primary storage device at the time the failure was detected is constructed on the spare storage device. The spare storage device is then assigned in the logical volume definition such that the spare storage device becomes a primary storage device. The reference to the failed primary storage device is removed from the logical volume definition.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 depicts a high level flow chart which illustrates converting a spare drive to a defined drive in a volume definition as a replacement for a failed drive in accordance with the present invention;

FIG. 5A is a block diagram of a storage subsystem having a failed drive in accordance with the prior art;

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

The present invention is a system, method, and computer program product for converting a spare storage device to a defined storage device in a logical volume. A logical volume definition includes a plurality of primary drives. When one of the primary drives fails, the data that had been stored on the failed drive is incorporated on a spare drive in accordance with whatever RAID standard the storage subsystem had been implementing. Once the data is incorporated, the spare drive is then defined within the volume definition as a primary drive, and the reference to the failed drive is removed from the volume definition. Thus, the role of the spare drive is changed to be that of a primary drive. In this manner, the spare drive directly and permanently takes the place of the failed drive. A new spare drive must then be added and defined in the subsystem because the original spare drive is no longer a spare drive.

The updating of the volume definition may be performed either automatically or manually. One method for determining whether to manually or automatically update the volume definition is to include a parameter in each spare disk that indicates whether the drive should be manually or automatically assigned when the drive is used as a replacement drive. If the parameter indicates that the volume definition should be updated automatically, once the data is incorporated on the spare drive, the volume definition may be updated without user intervention to reassign the role of the spare to be that of a primary drive.

Figure 1:
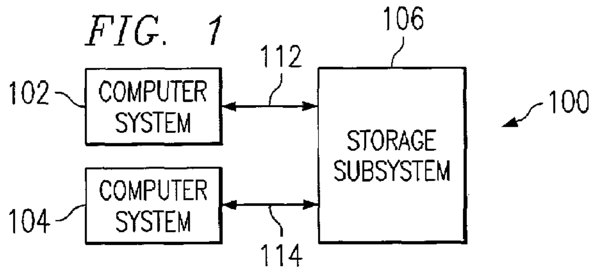
FIG. 1 is a block diagram of a data processing system in accordance with the present invention.

With reference now to the figures, and in particular with reference to FIG. 1, a data processing system 100 is depicted according to the present invention. Data processing system 100 includes computer systems 102 and 104, which are connected to storage subsystem 106. In the depicted example, storage subsystem 106 is a disk drive storage subsystem. Computer systems 102 and 104 are connected to storage subsystem 106 by bus 112 and bus 114. According to the present invention, bus 112 and bus 114 may be implemented using a number of different bus architectures, such as a small computer system interface (SCSI) bus or a fibre channel bus.

Figure 2:
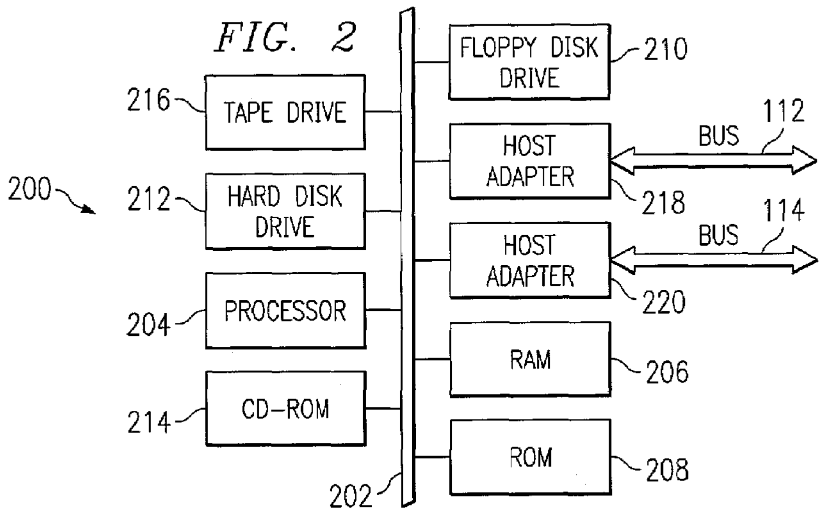
FIG. 2 is a block diagram of a computer system, such as the data processing system of FIG. 1, in which the present invention may be implemented.

Turning now to FIG. 2, a block diagram of a computer system 200, such as computer system 102 or 104 in FIG. 1, is illustrated in which the present invention may be implemented. Computer system 200 includes a system bus 202 connected to a processor 204 and a memory 206. Computer system 200 also includes a read only memory (ROM) 208, which may store programs and data, such as, for example, a basic input/output system that provides transparent communications between different input/output (I/O) devices. In the depicted example, computer system 200 also includes storage devices, such as floppy disk drive 210, hard disk drive 212, CD-ROM 214, and tape drive 216. Computer system 200 sends and receives data to a storage subsystem, such as storage subsystem 106 in FIG. 1, through host adapters 218 and 220, which are connected to buses 112 and 114, respectively. These host adapters provide an interface to send and receive data to and from a storage subsystem in a data processing system.

A storage subsystem is a collection of storage devices managed separately from the primary processing system, such as a personal computer, a work station, or a network server. A storage subsystem includes a controller that manages the storage devices and provides an interface to the primary processing system to provide access to the storage devices within the storage subsystem. A storage system is typically physically separate from the primary processing system and may be located in a remote location, such as in a separate room. These host adapters provide an interface to send and receive data to and from subsystem in a data processing system.

Programs supporting functions within host computer system 200 are executed by processor 204. While any appropriate processor may be used for processor 204, the Pentium microprocessor, which is sold by Intel Corporation and the Power PC 620, available from International Business Machines Corporation and Motorola, Inc. are examples of suitable processors. "Pentium" is a trademark of the Intel Corporation, and "Power PC" is a trademark of International Business Machines Corporation.

Additionally, databases and programs may be found within a storage device, such as hard disk drive 212. Data used by processor 204 and other instructions executed by processor 204 may be found in RAM 206 and ROM 208.

Figure 3A:
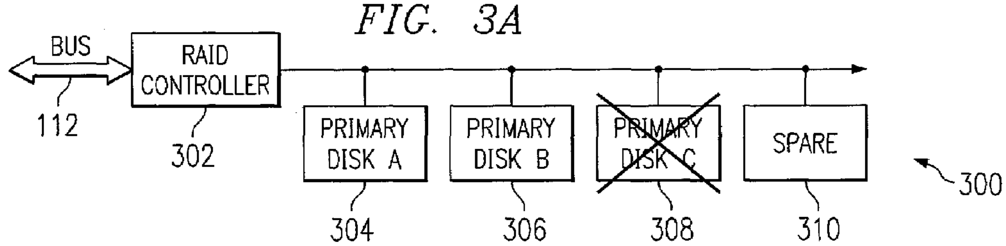
FIG. 3A is a block diagram of a storage subsystem, such as one of the storage subsystems of FIG. 1, having a failed drive where the spare has been defined in the volume definition as the replacement drive and the reference to the failed drive is removed in accordance with the present invention.

FIG. 3A is a block diagram of a storage subsystem, such as one of the storage subsystems of FIG. 1, having a failed drive where the spare has been defined in the volume definition as the replacement drive and the reference to the failed drive is removed in accordance with the present invention. In the depicted example, storage subsystem 300 is a disk drive (i.e., a hard disk drive) system containing a controller 302. FIG. 3A depicts additional detail for only one of the controllers and its associated drives of FIG. 2. Controller 302 is connected to bus 112. This controller controls primary disk drives 304, 306, and 308. Disk 310 is assigned as a spare that is used in accordance with a RAID level 1, 2, 3, 4, 5, or 6.

Figure 3B:
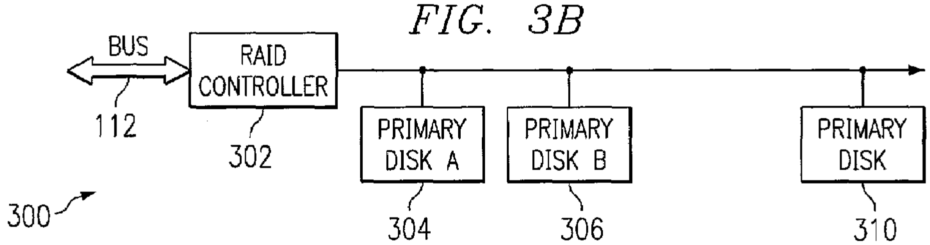
FIG. 3B is a block diagram of a storage subsystem, such as one of the storage subsystems of FIG. 1, where a drive that had been assigned as a spare is converted in a volume definition to be a primary drive as a replacement for a failed drive, further where the reference to the failed drive has been removed in accordance with the present invention.
Figure 5B:
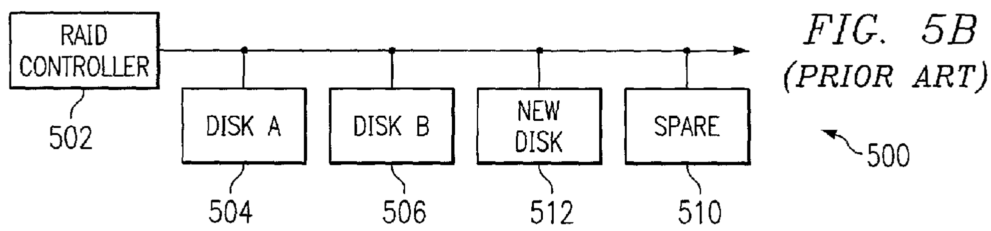
FIG. 5B is a block diagram of a storage subsystem where a new disk has replaced a failed disk requiring an update of the logical volume definition in accordance with the prior art.
Figure 6:
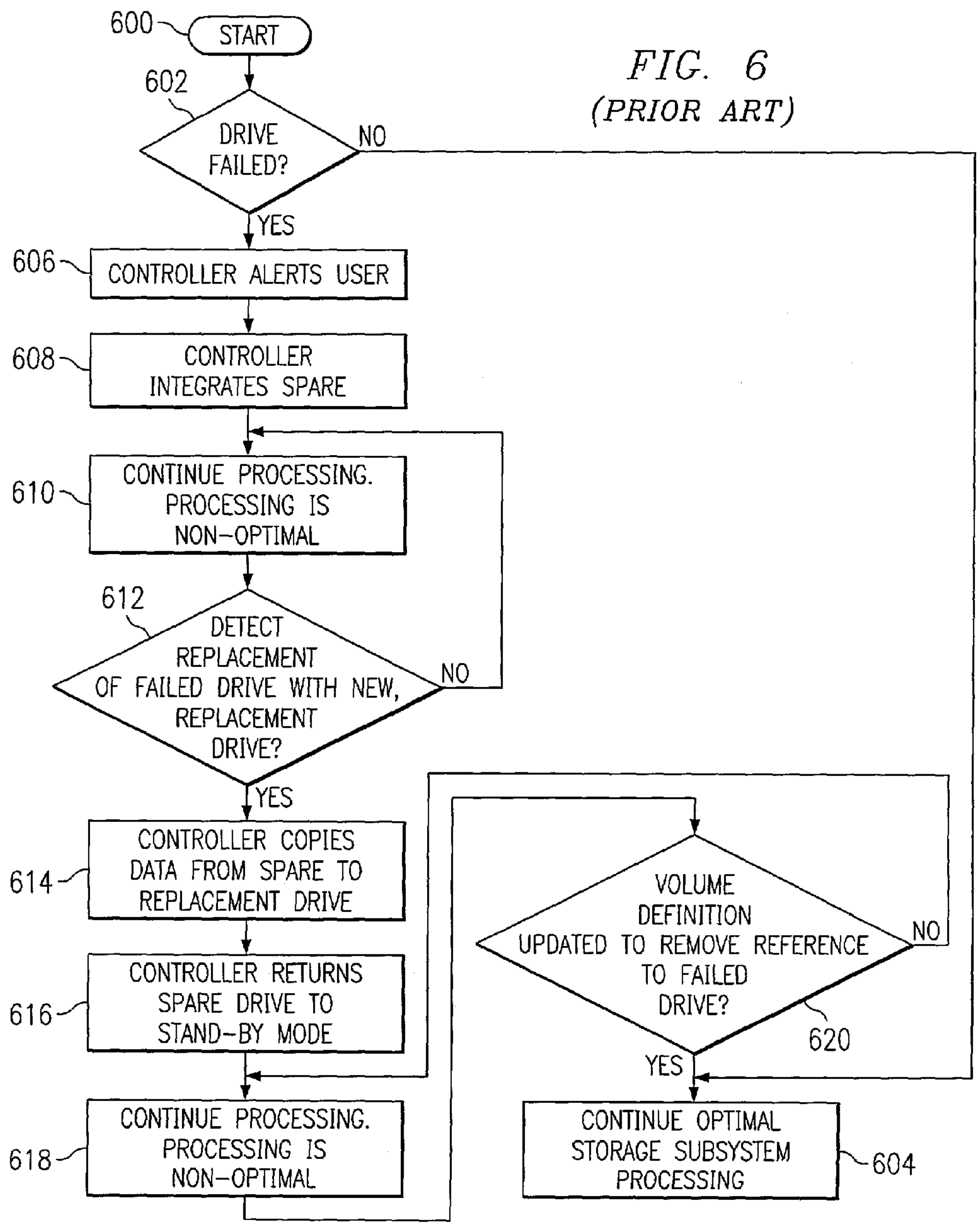
FIG. 6 illustrates a high level flow chart which depicts a replacement of a failed disk with a new disk requiring an update of the logical volume definition in order to continue optimal processing in accordance with the prior art.

FIG. 3B is a block diagram of a storage subsystem, such as one of the storage subsystems of FIG. 1, where a drive that had been assigned as a spare is converted in a volume definition to be a primary drive as a replacement for a failed drive, further where the reference to the failed drive has been removed in accordance with the present invention. In the example depicted by FIG. 3B, primary disk 308 has failed. According to the present invention, when controller 302 detects that primary disk 308 has failed, controller 302 integrates spare 310 by constructing the data that had been stored on primary disk 308. The data stored on primary disks 304 and 308 is used to construct the data that had been stored on primary disk 308 in accordance with the RAID level implemented by the storage subsystem.

Further in accordance with the present invention, the logical volume definition is updated, either manually or automatically, to reassign the role of drive 310 in the volume from that of a spare drive to that of a primary drive. Thus, drive 310 becomes a primary drive and is assigned in the volume definition as the replacement drive for failed drive 308. A new spare drive must be added to the system if a spare drive is desired to take the place of drive 310 because drive 310 is no longed available to be used as a spare drive. It is now used as one of the primary drives. The reference in the volume definition to failed drive 308 is removed. Therefore, optimal processing may continue because the volume definition includes a reference to each primary drive 304, 306, and 310. The reference to failed drive 308 has been removed.

FIG. 4 depicts a high level flow chart which illustrates converting a spare drive to a defined drive in a volume as a replacement for a failed drive in accordance with the present invention. The process starts as depicted by block 400 and thereafter passes to block 402 which illustrates a determination of whether or not a drive in the array has failed. If a determination is made that none of the disks has failed, the process passes to block 404 which depicts continuing optimal storage subsystem processing.

Referring again to block 402, if a determination is made that one of the drives has failed, the process passes to block 406 which illustrates the storage controller alerting the user that a drive has failed. Next, block 408 depicts the storage controller integrating the spare drive. When a drive is integrated, the data that was stored on the failed drive is reconstructed using the remaining drives. The reconstructed data is then stored on the spare drive.

Thereafter, block 410 illustrates the storage controller checking the spare's parameter. Next, block 412 depicts a determination of whether or not the parameter indicates that the drive should be assigned automatically or manually. If a determination is made that the drive should be assigned manually, the process passes to block 414 which illustrates prompting the user to assign the spare drive. At this time, the user may also reassign the other drives. Next, block 416 depicts the storage controller receiving the user's new drive assignment(s). The process then passes to block 418 which illustrates the storage controller removing from the volume definition the reference to the failed drive. At this time, the volume definition includes a reference to a primary drive that had been assigned as a spare and now is assigned as a primary, defined drive. The volume definition does not include a reference to any failed drive. The process then passes back to block 404.

Referring again to block 412, if a determination is made that the drive should be assigned automatically, the process passes to block 420 which illustrates the storage controller automatically reassigning the role of the spare drive in the volume definition such that the spare drive replaces the failed drive in the volume as a replacement drive for the failed drive. Thus, the role of the spare drive is converted to be that of a defined, primary drive. The process then passes back to block 418 which illustrates the storage controller removing from the volume definition the reference to the failed drive. The process then passes back to block 404.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for increasing data storage performance, the data processing system having a plurality of primary storage devices and a spare storage device, the method comprising the steps of:

establishing a logical volume definition that defines a logical volume utilizing said plurality of primary storage devices, said logical volume definition including a list of storage devices that are included in said logical volume, said logical volume definition including a designation of said spare storage device as being a "spare" device and a designation of each one of said plurality of primary storage devices as being a "primary" device;

detecting a failure of one of said plurality of primary storage devices;

reconstructing, on said spare storage device, data that was stored on said failed one of said plurality of primary storage devices at the time said failure was detected; and reassigning said spare storage device in said logical volume definition by changing said designation of said spare storage device from "spare" to "primary", wherein said spare storage device becomes a primary storage device.

2. The method according to claim 1, further comprising the step of removing from said volume definition a reference to said failed one of said plurality of primary storage devices.

3. The method according to claim 1, further comprising the steps of:

establishing a storage controller within said data processing system;

determining whether said step of reassigning said spare storage device should be executed automatically or manually; and in response to a determination that said step should be executed automatically, automatically, utilizing said storage controller, reassigning said spare device to be a primary device.

4. The method according to claim 1, further comprising the steps of:

establishing a storage controller within said data processing system;

including said logical volume definition within said storage controller; and utilizing said storage controller to detect a failure of one of said plurality of primary storage devices.

5. The method according to claim 1, further comprising the steps of:

establishing a storage controller within said data processing system;

including said logical volume definition within said storage controller; and utilizing said storage controller to reconstruct, on said spare storage device, data that was stored on said failed one of said plurality of primary storage devices at the time said failure was detected.

6. The method according to claim 1, further comprising the steps of:

including within said logical volume definition a reference to all of said plurality of primary devices that are included within a particular logical volume;

detecting a failure of one of said plurality of primary storage devices;

reconstructing, on said spare storage device, data that was stored on said failed one of said plurality of primary storage devices at the time said failure was detected; and adding a reference in said logical volume to said spare storage device, wherein said reference indicates that said spare is now a primary storage device; and removing from said logical volume definition a reference to said failed one of said plurality of primary storage devices.

7. A method in a data processing system for increasing data storage performance, the data processing system having a plurality of primary storage devices and a spare storage device, the method comprising the steps of:

establishing a logical volume definition that defines a logical volume utilizing said plurality of primary storage devices, said logical volume definition including a list of storage devices that are included in said logical volume, said logical volume definition including a designation of said spare storage device as being a "spare" device and a designation of each one of said plurality of primary storage devices as being a "primary" device;

detecting a failure of one of said plurality of primary storage devices;

reconstructing, on said spare storage device, data that was stored on said failed one of said plurality of primary storage devices at the time said failure was detected; and converting said spare storage device in said logical volume definition from a spare storage device to a replacement, primary storage device by changing said designation of said spare storage device from "spare" to "primary", wherein an additional replacement drive for said failed one of said plurality of primary storage devices is unnecessary.

8. The method according to claim 7, further comprising the step of removing from said volume definition a reference to said failed one of said plurality of primary storage devices.

9. A data processing system for increasing data storage performance, the data processing system having a plurality of primary storage devices and a spare storage device, said system comprising:

a logical volume definition that defines a logical volume utilizing said plurality of primary storage devices, said logical volume definition including a list of storage devices that are included in said logical volume, said logical volume definition including a designation of said spare storage device as being a "spare" device and a designation of each one of said plurality of primary storage devices as being a "primary" device;

means for detecting a failure of one of said plurality of primary storage devices;

means for reconstructing, on said spare storage device, data that was stored on said failed one of said plurality of primary storage devices at the time said failure was detected; and means for reassigning said spare storage device in said logical volume definition by changing said designation of said spare storage device from "spare" to "primary" wherein said spare storage device becomes a primary storage device.

10. The system according to claim 9, further comprising means for removing from said volume definition a reference to said failed one of said plurality of primary storage devices.

11. The system according to claim 9, further comprising:

a storage controller included within said data processing system;

said storage controller determining whether said reassignment of said spare storage device should be executed automatically or manually; and in response to a determination that said step should be executed automatically, automatically, said storage controller for reassigning said spare device to be a primary device.

12. The system according to claim 9, further comprising:

a storage controller included within said data processing system;

said logical volume definition being included within said storage controller; and said storage controller for detecting a failure of one of said plurality of primary storage devices.

13. The system according to claim 9, further comprising:

a storage controller included within said data processing system;

said logical volume definition being included within said storage controller; and said storage controller for reconstructing, on said spare storage device, data that was stored on said failed one of said plurality of primary storage devices at the time said failure was detected.

14. The system according to claim 9, further comprising:

said logical volume definition including a reference to all of said plurality of primary devices that are included within a particular logical volume;

means for detecting a failure of one of said plurality of primary storage devices;

means for reconstructing, on said spare storage device, data that was stored on said failed one of said plurality of primary storage devices at the time said failure was detected; and means for adding a reference in said logical volume to said spare storage device, wherein said reference indicates that said spare is now a primary storage device; and means for removing from said logical volume definition a reference to said failed one of said plurality of primary storage devices.

15. A computer program product in a data processing system for increasing data storage performances the data processing system having a plurality of primary storage devices and a spare storage device, said computer program product comprising:

instruction means for establishing a logical volume definition that defines a logical volume utilizing said plurality of primary storage devices, said logical volume definition including a list of storage devices that are included in said logical volume, said logical volume definition including a designation of said spare storage device as being a "spare" device and a designation of each one of said plurality of primary storage devices as being a "primary" device;

instruction means for detecting a failure of one of said plurality of primary storage devices;

instruction means for reconstructing, on said spare storage device, data that was stored on said failed one of said plurality of primary storage devices at the time said failure was detected; and instruction means for reassigning said spare storage device in said logical volume definition by changing said designation of said spare storage device from "spare" to "primary" wherein said spare storage device becomes a primary storage device.

16. The product according to claim 15, farther comprising instruction means for removing from said volume definition a reference to said failed one of said plurality of primary storage devices.

17. The product according to claim 15, further comprising:

instruction means for establishing a storage controller within said data processing system;

instruction means for determining whether said step of reassigning said spare storage device should be executed automatically or manually; and in response to a determination that said step should be executed automatically, automatically, instruction means for utilizing said storage controller, reassigning said spare device to be a primary device.

18. The product according to claim 15, further comprising:

instruction means for establishing a storage controller within said data processing system;

instruction means for including said logical volume definition within said storage controller; and instruction means for utilizing said storage controller to detect a failure of one of said plurality of primary storage devices.

19. The product according to claim 15, further comprising:

instruction means for establishing a storage controller within said data processing system;

instruction means for including said logical volume definition within said storage controller; and instruction means for utilizing said storage controller to reconstruct, on said spare storage device, data that was stored on said failed one of said plurality of primary storage devices at the time said failure was detected.

20. The product according to claim 15, further comprising:

instruction means for including within said logical volume definition a reference to all of said plurality of primary devices that are included within a particular logical volume;

instruction means for detecting a failure of one of said plurality of primary storage devices;

instruction means for reconstructing, on said spare storage device, data that was stored on said failed one of said plurality of primary storage devices at the time said failure was detected; and instruction means for adding a reference in said logical volume to said spare storage device, wherein said reference indicates that said spare is now a primary storage device; and instruction means for removing from said logical volume definition a reference to said failed one of said plurality of primary storage devices.

* * * * *